July 9, 1946.  E. J. MARTIN ET AL  2,403,669
INDUCTOR COMPASS
Filed April 20, 1944  2 Sheets-Sheet 1

Inventors
Edward J. Martin &
Carl E. Grinstead
By Blackmore, Spencer & Flint
Attorneys

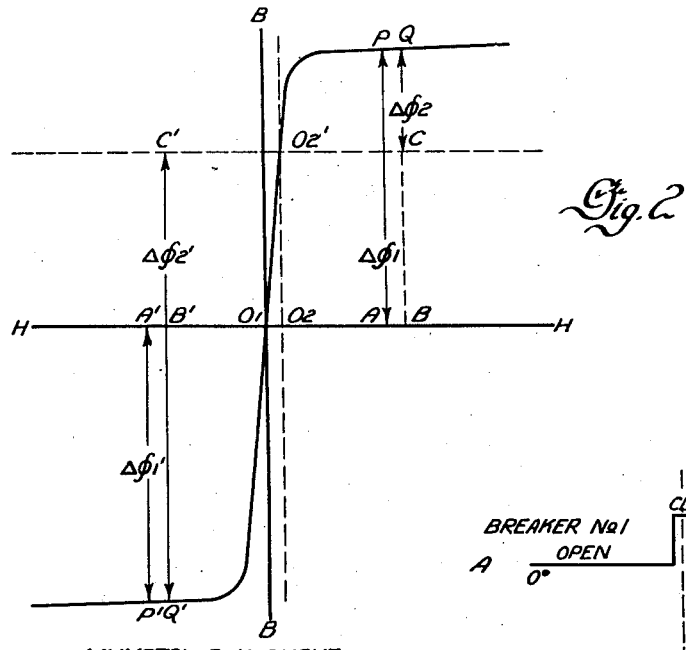
MUMETAL B-H CURVE
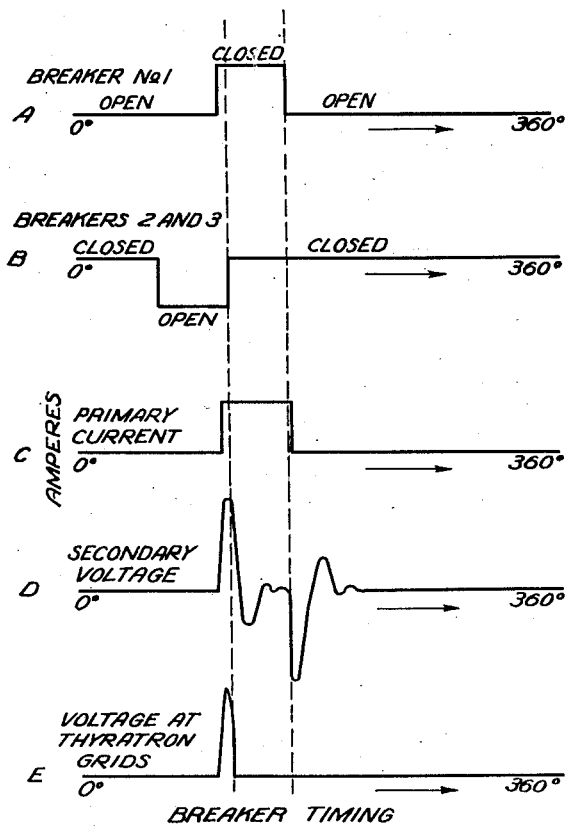
BREAKER TIMING

Patented July 9, 1946

2,403,669

UNITED STATES PATENT OFFICE 2,403,669

INDUCTOR COMPASS

Edward J. Martin, Pleasant Ridge, and Carl E. Grinstead, Detroit, Mich., assignors to General Motors Corporation, Detroit, Mich., a corporation of Delaware Application April 20, 1944, Serial No. 531,886

7 Claims. (Cl. 177—380)

This invention relates to direction sensitive or compass means and more particularly to means sensitive to variations in the detectable strength of some portion of the magnetic field of the earth whereby the same may be used to indicate direction or for control means. The standard means for indicating geographic direction or any variation thereof has in the past been the magnetic compass in which a magnetized needle or bar, delicately balanced and pivoted, aligns itself with the horizontal component of the earth's magnetic field to point toward the north magnetic pole. For service use, many of these compasses and the many variations thereof are open to the objection that they have relatively movable parts and in most cases these are carefully pivoted in delicate jewels or gimbals to reduce the friction to the lowest possible amount, and since these parts are relatively movable, present problems in inertia and balancing and will not stand much heavy use.

It is therefore an object of our invention to provide a direction-sensitive means having in itself no moving parts.

It is a further object of our invention to provide a direction-sensitive means operable by variation in the amount of flux due to the earth's field passing through the same.

It is a still further object of our invention to provide a direction-sensitive means sensitive to a variation in the amount of flux therein due to a change in its orientation in the earth's magnetic field.

It is a still further object of our invention to provide indicating or control means operable by such direction-sensitive device.

With these and other objects in view which will become apparent as the specification proceeds, the embodiments of our invention will be best understood by reference to the following specification and claims and the illustrations in the accompanying drawings, in which:

Figure 2 is a magnetization or B-H curve of the Mumetal core of the sensitive portion of our device; and Figure 3 is a graphic disclosure showing the relative positions of the switches at different points of cyclic operation and the associated currents and voltages in the system at these instants.

Figure 1:
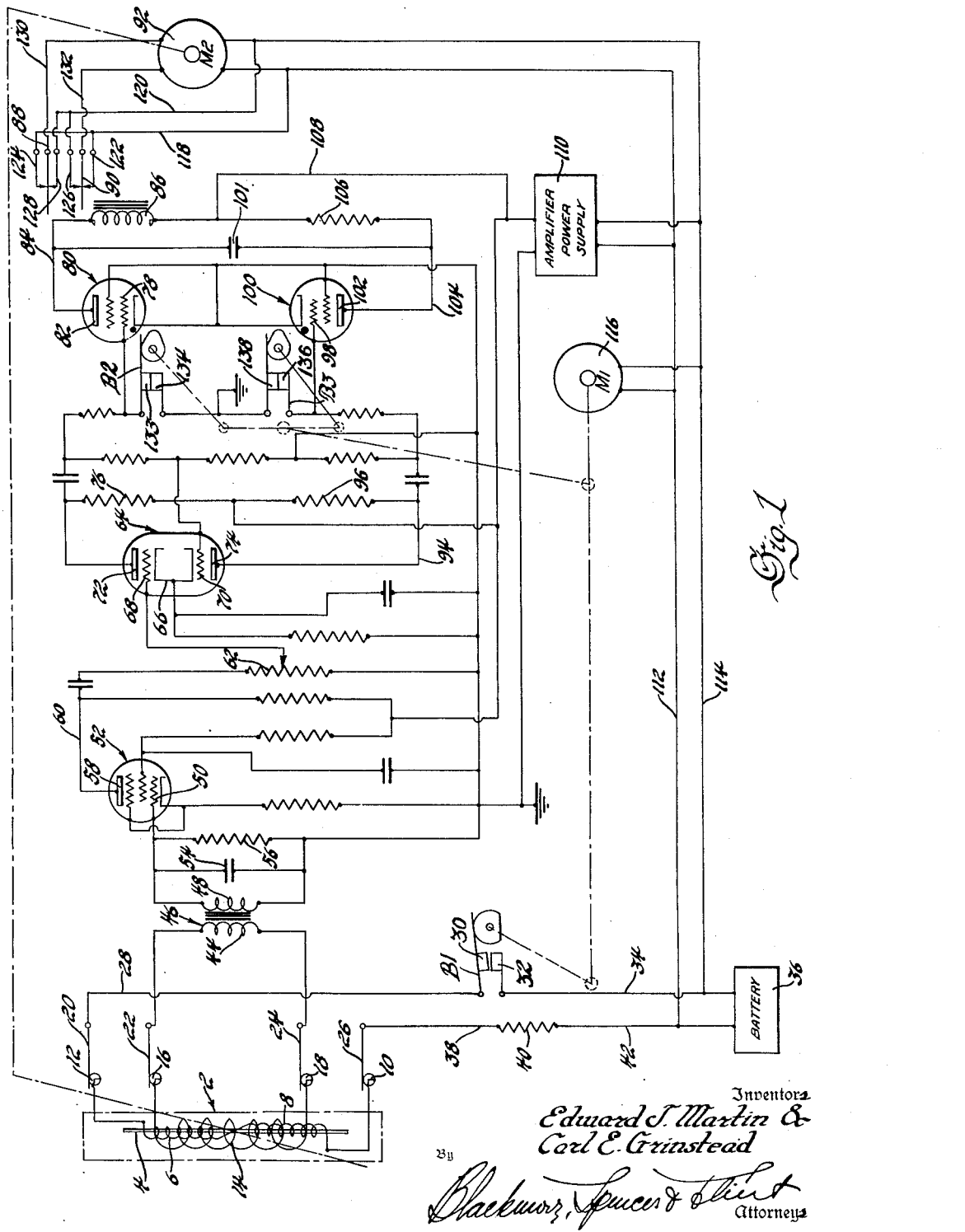
Figure 1 is a circuit diagram showing the entire system of our invention.

Referring now more specifically to Figure 1, there is shown therein a pivoted direction-sensitive head 2 indicated by dot-and-dash lines which comprises a thin central needle or rod 4, preferably made of Mumetal, or some equally high permeability material, which has wound thereon two identical primary coils 6 and 8 having the same number of turns but which are wound in opposite directions and are axially displaced on the rod 4. These two coils are connected in series relation, the opposite end of coil 8 being connected to contact 10 and the opposite end of 6 being connected to contact 12. Thus when current is passed through the two, they will create equal and opposite fields in the small rod core 4. Wound over these two primary coils is a single secondary 14 having its terminals connected to contacts 16 and 18. This comprises the sensitive movable pick-up head. Connecting means which may be a pronged plug having prongs 20, 22, 24 and 26, connects contacts 12, 16, 18 and 10, respectively, to the source of power and indicating or control apparatus.

Prong 20 is connected through line 28 with the movable contact 30 of an interrupter whose associated stationary contact 32 is connected through line 34 with one terminal of a battery 36. Prong 26 is connected through line 38 to a resistor 40, the opposite terminal of which is connected through line 42 to the opposite terminal of the battery. These, therefore, supply the power to the primaries 6 and 8. Prongs 22 and 24 are connected to the primary 44 of a transformer 46, the secondary 48 of which has one terminal connected directly to control grid 50 of amplifier tube 52 and which has connected directly thereacross in parallel condenser 54 and resistor 56. The plate 58 of the tube 52 is connected through line 60 and resistance coupling units 62 to the input of a phase inverter tube 64 having therein a common cathode 66, a pair of grids 68 and 70 and their respective plates 72 and 74.

Plate 72 of the tube 64 is connected through resistance coupling 76 to the control grid 78 of a tube 80 of the "thyratron" type. The plate 82 of this tube is connected through line 84 with a control relay coil 86 which through its spring biased armature operates a plurality of reversing switches 88 and 90 to control the direction of rotation of a motor 92 which drives a follow-up mechanism back to the sensitive head. This follow-up mechanism is indicated by the dot-and-dash connection between the motor 92 and the axis of the head 2. Plate 74 of the phase inverter tube 64 is likewise connected through line 94 and resistance coupling 96 to control grid 98 of a second thyratron tube 100, the plate 102 of which is connected through line 104 and resistor 106 to the opposite terminal of the relay coil 86. A control condenser 101 is connected between lines 94 and 104. Line 108 is connected between the resistor 106 and the relay coil 86 and returns to the output of the amplifier power supply 110.

Power lines 112 and 114 extend from the battery 36, to a small motor 116, to the input of the power supply amplifier 110, and to the field of the control motor 92. Lines 118 and 120 are connected to the power lines 112 and 114 and extend to switch points 122, 124, 126 and 128 of the reversing switches 88 and 90, the two movable terminals of which are connected through lines 130 and 132 to the armature of the motor 92. The grid 78 of the Thyratron 80 is connected to a movable contact 133 which cooperates with contact 134 which is in turn connected to ground. In like manner control grid 98 of thyratron 100 is connected to contact 136 associated with movable contact 138 which is likewise grounded. It will be seen that there are in this system three movable contactors, 30, 133 and 138, and these are all operated simultaneously at relatively high speed by the control motor 116 which connection is diagrammatically shown by the dot-and-dash connections between the motor 116 and the contactors mentioned. This particular motor in this instance is driven at approximately 900 R. P. M. and therefore the breakers open 900 times per minute.

Returning now to the sensitive control head per se, this as previously described consists of a single needle or small rod core 4 about which are wound two primary coils of the same number of turns, oppositely wound in series and axially aligned, and over these two is wound a single secondary. If we place this assembly so that the axis of the rod is in east-west position, none of the earth's flux will pass axially through the rod. If current is now passed through the two primary windings 6 and 8 at this time, flux will be generated by each in the degree shown in Figure 2, which is the Mumetal magnetization curve. Assuming, therefore, that no other field is affecting the Mumetal rod, the point $O_1$ may be taken as the origin. The current pulse sent through one of the windings will therefore produce a magnetic field of the intensity $O_1$—A and the flux $\Delta\phi_1$ induced in the Mumetal will be proportional to the height of the magnetization curve at this point which will be the distance A—P. This flux will be produced in half the Mumetal rod by the coil 6. At the same instant in the other half of the rod the other primary coil 8 will in like manner produce flux $\phi\Delta_1'$ proportional to A'—P'. These fluxes will induce equal and opposite voltages in the secondary coil 14 and the resultant voltage across the output terminals 16, 18 will be zero.

Therefore, as long as the rod lies in an east-west direction, or 180° reversed in a west-east direction so that no flux of the earth's field passes axially therethrough, even though current is applied to the primary windings, no output will appear at the terminals of the secondary. If, now, the sensitized head is turned so that some proportion of the flux of the earth's field passes therethrough to an intensity assumed as at $O_2$, this field intensity $O_1$—$O_2$ will shift the Y-axis a distance equal to $O_1$—$O_2$ and induce a flux corresponding to $O_2$—$O_2'$ in the Mumetal. Now $O_2'$ becomes the origin for the consideration of the effect of the application of the primary current, and if a current pulse is now sent through the winding to produce a magnetic field of intensity $O_1$—A as before, this field strength will now be $O_1$—A plus $O_1$—$O_2$ or $O_1$—B. Therefore, the flux $\Delta\phi_2$ induced by primary 6 will now only be C—Q inasmuch as the earth's field has raised the initial level to $O_2'$.

At the same time the field intensity for winding 8 has now become $O_1$—A' minus $O_1$—$O_2$ or $O_1$—B', moving this value to the right as shown on the B-H curve, Figure 2. Therefore, the flux $\Delta\phi_2'$ due to winding 8 is now increased materially to C'—Q' and since the two fluxes are opposed, the resultant flux will be the difference therebetween and this will induce in the secondary 14 an appreciable voltage which will appear across the output terminals 16 and 18. Of course, the further the sensitive head is turned toward a north-south position, the greater proportion of the earth's flux will flow through the Mumetal rod until at the north-south position the maximum effect is obtainable.

In order to obtain an interrupted current which must be applied to transformers, it is necessary to break the primary circuit since the source is a battery providing only direct current. Also, in order to amplify and transform the current after the same has been induced in the secondary, it is also necessary to provide an alternating current of known frequency and therefore the motor 116 rotating at a relatively high rate operates a series of breaker contacts in various parts of the system.

The output of secondary 14 is first applied to a transformer 44—48 and thence to the input of an amplifier tube 52 where it is amplified by a desired amount. The output of the amplifier is then applied to a phase inverter which amplifies and also inverts for supplying equal and opposite voltages to the control grids of the two thyratron tubes 80 and 100. One characteristic of a thyratron tube is that once it has been ignited it continues to pass current until the voltage thereacross goes to zero and therefore in order to properly synchronize the operation with the frequency of the initial current, the two breakers just mentioned operated by motor 116 are provided to ground the control grids at the proper instant. Only one thyratron will conduct current at one time as they are connected inversely. The plate voltage supply through line 108 to plate 82 of tube 80 is through relay coil 86 and that to plate 102 of tube 100 through resistor 106 of substantially the same impedance. The condenser 101 is provided to cause the plate voltage of the tube which has been conducting to go to zero upon a reversal of control current and the other tube becoming conducting in the manner well-known in inverter circuits. Thus as the thyratrons alternately become conductive, the relay coil will be energized when tube 80 conducts but becomes deenergized when the tube 100 conducts thus permitting the spring bias to reverse the control switches 88 and 90 of the motor 92 and therefore reversing the direction of rotation thereof. It will also be noticed that this system is a hunting one; in other words, the control motor 92 which controls the position of the compass head in the earth's field is always operating in one direction or the other, or hunting about a given point.

Referring now to Figure 3 wherein there is diagrammatically shown the operation of the different breakers and the affect thereof on the voltage and currents in the circuit controlling the control and follow-up motor 92, diagram A shows a complete cycle for breaker $B_1$ which is in the primary circuit. It will be noted that this breaker is open for most of the rotation of the cam being closed for only approximately 30° of its rotation. 3B illustrates the operating cycle of breakers B₂ and B₃. These operate together and are closed during a major part of the cycle, but open for approximately the same length of time as B₁ is closed but are so phased that they close a short time after B₁ closes. 3C shows the pulse of primary current that flows due to the closure of B₁, and 3D the voltage that is induced in the secondary by such flow of current. This illustrates the peak induced by the initial flow of current and the reverse peak induced by the breaking of said flow.

It is, however, only desired to utilize the first peak of the secondary voltage or that induced by the closing of the primary circuit. Breakers B₂ and B₃ are therefore closed through a major portion of the cycle which grounds both control grids of the two tubes 80 and 100. These breakers are, however, opened a short time previous to the closing of the primary circuit as will be seen by comparing 3B and 3C diagrams. Therefore when the secondary voltage is applied by closing the primary, the amplified voltage is applied to the grids of tubes 80 and 100, but only for a short time per cycle, sufficient to utilize the peak, and then the grids are again grounded. Since the tubes are connected inversely, only the one having the proper polarity with respect to its plate will conduct when this voltage is applied.

This discussion has been with respect to the factors of operation for one cycle or revolution of the shaft of the motor 116. This motor is a moderately high speed motor as previously stated and at 900 R. P. M. will impress upon the grids that number of voltage pulses which, however, will have no affect on the conducting tube as that will only be affected by a reversal of current and the tube conducting will supply a continuous flow of current through the coil 86 to hold the control switches for motor 92 in a desired position until the conditions in the sensitive head change. Assuming that the voltage shown in Figure 3E will cause tube 80 to conduct, then if the initial voltage were of opposite polarity, tube 100 would be energized. The polarity of this initial secondary voltage depends upon the direction of flow of the earth's flux through the core or the position thereof in the earth's field.

In an east-west position of the sensitive head, none of the earth's flux will link with the core and no control voltage will be applied to the control tubes 80 and 100. If the sensitized head is now rotated clockwise from east-west position, the voltage induced in the secondary 14 will be of one polarity, while if the same is rotated in a counterclockwise direction from east-west neutral, the voltage will be of opposite polarity, and through the amplifier and phase reversal, the application to the two thyratrons determines which way the relay 86 will hold the control switch and therefore the direction of rotation of the control and follow-up motor 92. This motor, of course, as well as maintaining the sensitized head in a particular geographical position, may also at the same time either control directly indicating, steering or other control apparatus, or indirectly control the same through relays.

We claim:

1. In direction-sensitive means for use in the earth's magnetic field, an elongated core member of high permeability mounted in the earth's field, induction magnetizing means for creating equal and opposite fields mounted on said core, induction pick-up means also mounted on said member, amplifying means connected to the pick-up means, a pair of inversely connected electron tubes alternatively controlled by the amplifier, and synchronized interrupter means in the induction magnetizing supply and in the input to the electron tubes.

2. In direction-sensitive means, a member of high permeability movably mounted in the earth's magnetic field, magnetizing means mounted on said member, an induction pick-up coil also mounted on said member, an amplifier coupled to the pick-up coil, phase inversion means connected to the output of the amplifier, a plurality of inversely connected electron tubes connected to the phase inverter so that the latter will be alternatively energized depending upon the polarity of the voltage in the pick-up coil, current control switching means in the connection to the magnetizing means and between the phase inverter and the electron tubes and common means for actuating the same in a predetermined relation.

3. In direction-sensitive means for use in the earth's magnetic field, a highly permeable member in said field, magnetizing means mounted on said member, induction pick-up means also mounted on said member, an output circuit connected to said pick-up means, a direct current voltage source, means for periodically impressing a square wave voltage from said source on said magnetizing means and interrupting means connected in said output circuit synchronized with said periodic impressing means to erase undesired portions of output current.

4. In direction-sensitive means for use in the earth's magnetic field, a highly permeable member in said field, a plurality of magnetizing means in opposing relation mounted on said member, inductive pick-up means also mounted on said member, an output circuit connected to said pick-up means, a direct current voltage source, means for periodically impressing a square wave voltage upon the said magnetizing means to oppositely saturate sections of the permeable member resulting in zero voltage in the pick-up means when no earth's flux is present and proportional voltage variation when there is earth's flux interlinkage and interrupting means connected in said output circuit synchronized with said periodic impressing means to erase undesired portions of the output current.

5. In means for indicating the direction of a magnetic field, a highly permeable member subject to said field, magnetizing means mounted on said member, induction pick-up means also mounted on said member, an output circuit connected to said pick-up means, a direct current voltage source, a plurality of synchronized switching means a part of which are between the source and the magnetizing means to periodically apply a square wave voltage to the magnetizing means and the remainder in the output circuit to interrupt the same in timed relation to erase undesired portions of the output current.

6. In direction-sensitive means for use in the earth's magnetic field, a highly permeable member subject to said field, a plurality of magnetizing means in opposing relation mounted on said member, pick-up means also mounted on said member in inductive relation to the same and to the magnetizing means, means for impressing a square voltage wave upon the magnetizing means to provide a peaked voltage pulse in the pick-up coil and switching means synchronized with the voltage impressing means to erase undesired portions of the output current.

7. In direction-sensitive means for use in a magnetic field, a highly permeable member in said field, a pair of spaced oppositely wound magnetizing coils on said member, a source of direct current voltage, means for periodically impressing a square wave voltage upon said magnetizing coils to oppositely saturate sections of the permeable member, a pick-up coil mounted on said member, an output circuit connected to the pick-up coil including an amplifier, a phase inverter connected to said amplifier and a pair of inversely connected electronic discharge tubes connected to the inverter, switching means between the phase inverter and the electron tubes and common means for operating the switching means and the means for periodically impressing the voltage wave upon the coils so that the two will be synchronously actuated in phased relation.

EDWARD J. MARTIN.
CARL E. GRINSTEAD.